United States Patent
Li

(10) Patent No.: US 8,446,938 B2
(45) Date of Patent: May 21, 2013

(54) METHOD AND APPARATUS FOR ESTIMATING CARRIER FREQUENCY OFFSET

(75) Inventor: Yan Li, Shanghai (CN)

(73) Assignee: NXP B.V., Eindhoven (NL)

( * ) Notice: Subject to any disclaimer, the term of this patent is extended or adjusted under 35 U.S.C. 154(b) by 1186 days.

(21) Appl. No.: 12/305,842

(22) PCT Filed: Jun. 14, 2007

(86) PCT No.: PCT/IB2007/052267
§ 371 (c)(1),
(2), (4) Date: Dec. 19, 2008

(87) PCT Pub. No.: WO2007/148267
PCT Pub. Date: Dec. 27, 2007

(65) Prior Publication Data
US 2009/0274250 A1    Nov. 5, 2009

(30) Foreign Application Priority Data
Jun. 20, 2006  (CN) .......................... 2006 1 0093822

(51) Int. Cl.
*H04B 3/46* (2006.01)
*H03K 9/06* (2006.01)
*H04J 3/00* (2006.01)

(52) U.S. Cl.
USPC ............................ 375/226; 375/322; 370/336

(58) Field of Classification Search
USPC ................................... 375/226, 322; 370/336
See application file for complete search history.

(56) References Cited

U.S. PATENT DOCUMENTS

| | | | |
|---|---|---|---|
| 4,527,278 A | | 7/1985 | Deconche et al. |
| 4,542,514 A * | | 9/1985 | Watanabe ..................... 375/226 |
| 5,440,267 A * | | 8/1995 | Tsuda et al. .................. 329/308 |
| 5,732,113 A * | | 3/1998 | Schmidl et al. ............... 375/355 |
| 6,097,770 A * | | 8/2000 | Bahai et al. ................... 375/343 |
| 6,771,699 B1 * | | 8/2004 | Karaoquz et al. ............. 375/224 |
| 7,149,266 B1 * | | 12/2006 | Imamura et al. .............. 375/355 |
| 7,218,691 B1 * | | 5/2007 | Narasimhan ................... 375/344 |
| 2003/0185180 A1 | | 10/2003 | Min et al. |
| 2004/0067741 A1 * | | 4/2004 | Fei et al. ..................... 455/192.1 |
| 2004/0196928 A1 | | 10/2004 | Hessel |
| 2005/0107061 A1 | | 5/2005 | Grieco et al. |

(Continued)

FOREIGN PATENT DOCUMENTS

| EP | 1225739 A | 7/2002 |
|---|---|---|
| WO | 0186904 A1 | 11/2001 |

*Primary Examiner* — David C. Payne
*Assistant Examiner* — Sarah Hassan

(57) ABSTRACT

In order to improve precision for estimating carrier frequency offset and reduce computing load, the present invention provides a method for estimating carrier frequency offset, which comprises steps of calculating a plurality of corresponding intermediate CFOs, respectively, based on one received sync sequence and one prestored sync sequences stored sync sequence through multi-step calculation, wherein, in each step, one corresponding intermediate CFO is calculated based on said received sync sequence and said pre-stored sync sequence; and weighting said plurality of intermediate CFOs in accordance with channel quality of a channel transmitting said received sync sequence to generate one final CFO. Each of the selected sequence segments may have a length and a mutual distance which are both, at its maximum, the full length of the sync sequence minus 1 so as to improve precision for the intermediate CFOs. Further, the estimation precision for the final CFO is improved by considering the impact of quality difference of reception channels on the intermediate CFOs.

17 Claims, 3 Drawing Sheets

U.S. PATENT DOCUMENTS

2006/0067430 A1* 3/2006 Wu et al. .................. 375/322
2006/0285599 A1* 12/2006 Seki et al. ................. 375/260
2007/0268871 A1* 11/2007 Min et al. .................. 370/336
2008/0095274 A1* 4/2008 Becker et al. ............. 375/326

* cited by examiner

METHOD AND APPARATUS FOR ESTIMATING CARRIER FREQUENCY OFFSET

The present invention relates generally to a wireless communication network, and more particularly to a method and an apparatus for estimating carrier frequency offset.

Within various communication systems employing carrier modulation, to recover information correctly in a receiver, it is necessary to achieve several synchronization processes including synchronization between local carrier frequency and modulation frequency for realizing coherent demodulation on received signals, synchronization of local clock for optimizing sampled and demodulated signals, frame synchronization and so on. In order to fulfill these synchronization processes, it is required to synchronize an essentially local carrier frequency used when a receiver demodulates a received signal with a modulation carrier frequency used when a transmitter modulates a corresponding transmission signal, or that the error between these carrier frequencies is almost negligible. However, due to limitations on the precision of a local oscillator for the transmitter/receiver and on the performance of the relevant frequency generation circuit, inequality and unsynchronization commonly occur between local and modulation carrier frequencies, thereby leading to the occurrence of Carrier Frequency Offset (CFO). Among a variety of solutions, a common scheme is to obtain the CFO by evaluating a received sync sequence that can be a preamble, midamble, or other available trained sequence contained in transmission signal, transmitted by a transmitter and predicted by a receiver.

In general, a wireless signal is received by a receiver and subjected to local processing, such as Radio Frequency (RF) sampling, down-frequency conversion, sampling, digital-to-analog conversion and etc., to obtain a received sync sequence which has undergone channel transmission and local processing. The receiver processes the received sync sequence using a known sync sequence stored locally in advance to evaluate the frequency offset between the local carrier frequency and the modulation carrier frequency of the wireless signal, that is, the carrier frequency offset CFO. In existing processing methods, the above processing is often based on a sync sequence that is stored locally and a received sync sequence, and then carrier frequency offset is evaluated through segmentation, correlation, phase and phase difference calculation and the like.

In addition to the basis of pre-stored local and sync sequence and received sync sequence, the method and apparatus provided in the present invention further makes reference to the channel quality of a channel transmitting a corresponding wireless signal and introduces its impact on the CFO evaluation into the operation of the CFO evaluation so as to improve the precision for estimating the carrier frequency offset.

The computing load for CFO evaluation may be decreased by reducing the number of sequence segments selected in segmentation operation, and the precision for CFO estimation may be improved by extending the selection range for the length of a selected sequence segment and the distance between sequence segments.

According to an embodiment of the invention, there is provided a method for estimating the carrier frequency offset, comprising calculating a plurality of corresponding intermediate CFOs, respectively, based on one received sync sequence and one pre-stored sync sequence through multi-step calculation, in each step one corresponding intermediate CFO is calculated based on the received sync sequence and the pre-stored sync sequence, and weighting the plurality of intermediate CFOs in accordance with, channel quality of a reception channel corresponding to the received sync sequence to generate one final CFO.

In each calculation step, a first sequence segment and a second sequence segment may be selected from the received sync sequence, and a third sequence segment and a forth sequence segment from the pre-stored sync sequence, with the four sequence segments being same in length and the third and forth sync sequences lying at the same positions in the prestored sync sequence as the first and second sync sequences in the received sync sequence, respectively. The one intermediate CFO may be calculated based on the four sequence segments.

The selected four sequence segments may have different lengths varying with different steps so as to obtain a plurality of phases having different precisions, and the distance between the first and second sequence segments may vary in different steps to obtain a plurality of phase differences having different precisions. Using the plurality of phases and phase differences of different precisions, it is possible to calculate a plurality of intermediate CFOs having different precisions.

According to the embodiment, there is further provided a receiver comprising a first memory, a second memory, one selector, one CFO calculator and a weighting unit.

The first memory and the second memory are configured to store one received sync sequence and one pre-stored sync sequence, respectively. The selector is configured to perform a multi-step operation to select a plurality of sequence segments from the received sync sequence and the pre-stored sync sequence, and in each step the selector selects a first sequence segment and a second sequence segment from the received sync sequence as well as a third sequence segment and a forth sequence segment from the pre-stored sync sequence. The CFO calculator is configured to generate, in the multi-step operation, a plurality of intermediate CFOs according to the plurality of sequence segments selected by the selector, wherein each step one intermediate CFO is calculated according to the received four sequence segments by the CFO calculator. The weighting unit is configured to weight the plurality of intermediate CFOs based on the length of a sequence segment according to each of the intermediate CFOs and channel quality of a channel transmitting the sync sequence so as to generate one final CFO.

Furthermore, since only four sequence segments are selected in each calculation step in the embodiment, redundant computation is decreased and hence the computing load is lighter than that for a conventional evaluating method.

Additionally, since it is not required to select two adjacent sequence segments from one sync sequence during each selection, each of the selected sequence segments can have a length which is, at its maximum, the full length of the sync sequence minus 1, and hence a phase with the highest precision can be obtained. Alternatively, the two sequence segments can overlap partially, so the distance between the two sequence segments can be, at its maximum, the full length of the sync sequence minus 1, and hence a phase difference with the highest precision can be obtained.

Advantageously, the size of required computing load can be optimized according to difference in channel quality. For example, when the channel quality is good, accuracy for the final CFO can be maintained simultaneously without calculating any very long sequence segment, while at the time of bad channel quality, it is unnecessary to calculate any very short sequence segment, and thus the impact on accuracy for the final CFO can be avoided.

According to the embodiment, there is further provided a mobile device comprising:

a front-end processing unit for converting one received wireless signal into one received sync sequence;

a carrier frequency offset estimator including:

a first memory for storing said received sync sequence;

a second memory for storing one pre-stored sync sequence;

a selector for selecting a plurality of sequence segments from said received sync sequence and said pre-stored sync sequence through multi-step calculation, wherein, in each step said selector selects a first sequence segment and a second sequence segment from said received sync sequence as well as a third sequence segment and a forth sequence segment from said pre-stored sync sequence;

a carrier frequency offset calculator for generating a plurality of intermediate CFOs through multi-step calculation based on received plurality of sequence segments, wherein, in each step, said CFO calculator receives said four sequence segments and calculates one intermediate CFO;

a weighting unit for weighting said plurality of intermediate CFOs based on an indication of said selector and said channel quality so as to generate one final CFO; and a local carrier generator, wherein said final CFO is utilized to adjust a frequency for a local carrier generated by said local carrier generator.

The invention will become more readily understood by referring to the following detailed description of the embodiment in connection with the accompanying figures.

Throughout the figures, same or similar reference symbols denote same or similar functions and features.

The method for CFO evaluation proposed by the embodiment of the invention is to perform an operation in multiple calculation steps to obtain a final CFO.

Figure 1:
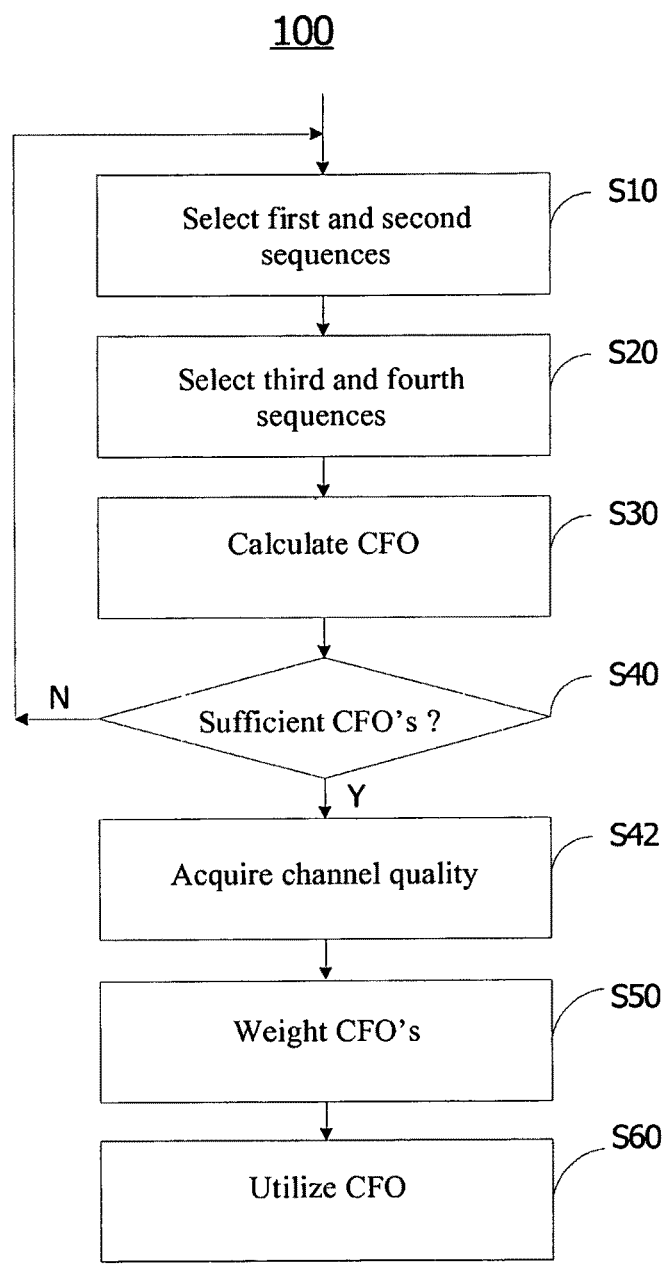
FIG. 1 shows diagrammatically a flowchart for a method implemented according to the embodiment of the invention.

FIG. 1 diagrammatically shows a flowchart for the method implemented according to the embodiment. In the method 100, a first sequence segment and a second sequence segment are selected from a received sync sequence at first step S10; then a third sequence segment, and a forth sequence segment are selected from a pre-stored sync sequence at a second step S20. Next, one intermediate CFO is calculated from the selected four sync sequences at step S30; and in step S40 it is judged whether more intermediate CFOs need to be calculated, with the criterion for judgment being whether a predefined number of intermediate CFOs have been obtained, whether the differences between a plurality of successively-calculated intermediate CFOs is less than one predefined threshold value and the like. If more intermediate CFOs need to be calculated, the flow returns to step S10 to continue computing. The system acquires the channel quality of a channel transmitting the received sequence during step S42, by means of evaluation and the like. At step S50, the plurality of intermediate CFOs are weighted according to the channel quality of the corresponding channel to generate a final CFO; and the final CFO is utilized in step S60 to regulate a local carrier generation circuit so as to generate required local carrier. It should be noted that the order of steps S10 and S20 can be interchanged.

Figure 2:
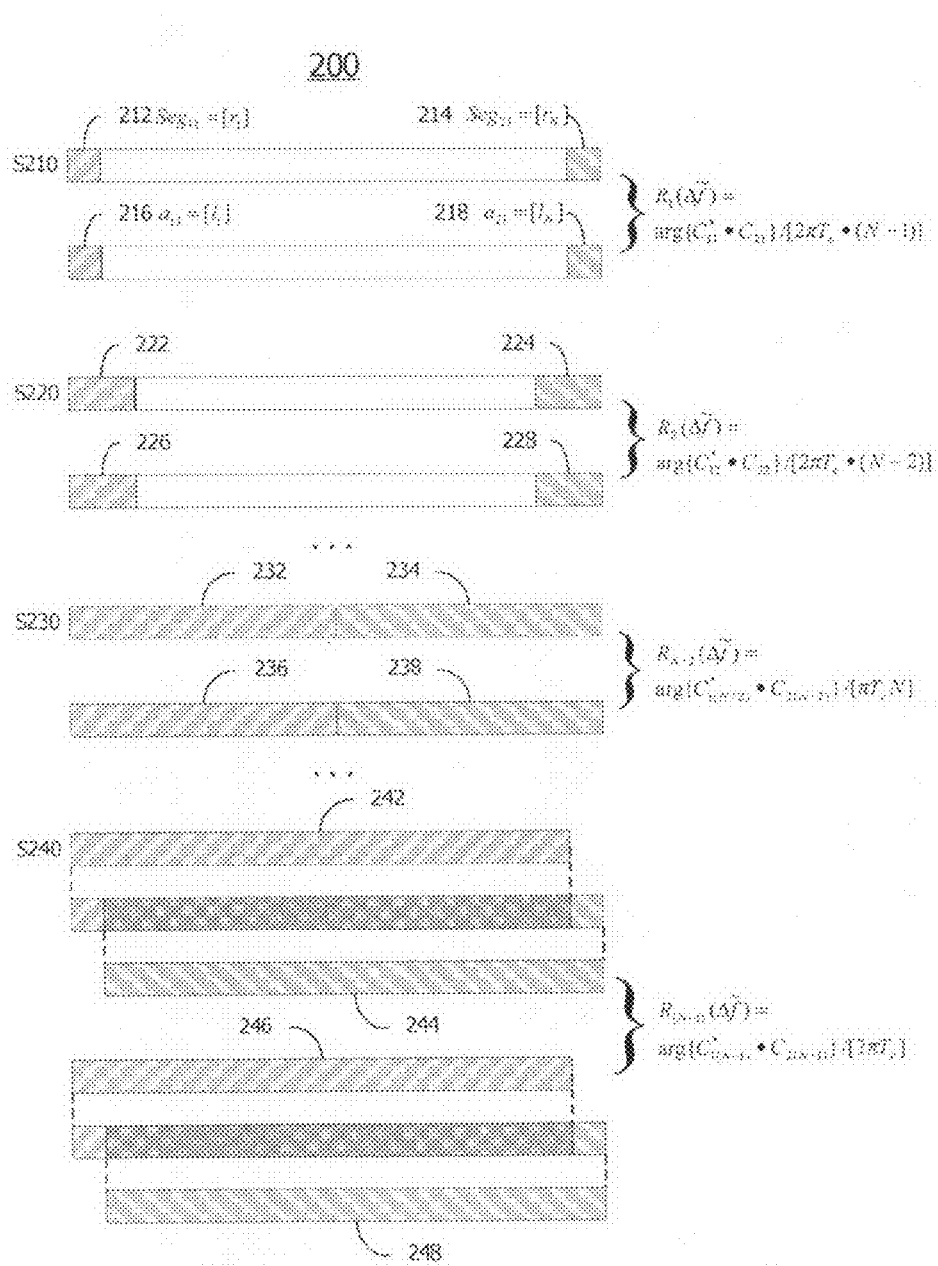
FIG. 2 shows diagrammatically a schematic diagram for selecting sequence segments and calculating a plurality of corresponding intermediate CFOs in different steps in the method implemented according to the embodiment.

FIG. 2 depicts a schematic diagram of the method for calculating a plurality of intermediate CFOs implemented according to the embodiment. In the method 200, two sequence segments of same length, i.e., a first sequence segment 212 and a second one 214, are selected from the received sync sequence in step S210, and the value of the length is given as an integer in the range of [1, N−1], where N is the length of the received sync sequence. The two selected sequence segments can be either adjacent or not, or can either overlap or not. The received sync sequence usually has the same length as that of the pre-stored sync sequence. Two sequence segments, i.e., a third sequence segment 216 and a forth one 218, are selected correspondingly from the pre-stored sync sequence. In general, the four sequence segments are same in length and the third and forth sync sequences lie at the same positions in the pre-stored sync sequence as the first and second sync sequences in the received sync sequence, respectively, so as to take advantage of self-correlation characteristics of the sync sequences.

The received sync sequence of length N can be represented as [r1, r2, ..., rN−1, rN], where ri, i={1, ..., N} represents one symbol after channel transmission and local processing such as sampling and the like. The first sequence segment 212 can be represented as Seg11=[r1], and the second sequence segment 214 can be represented as Seg21=[rN]. The pre-stored sync sequence of length N can be represented as [I1, I2, ..., IN−1, IN], where Ii, i={1, ..., N} represents one symbol. The third sequence segment 216 can be represented as a11=[I1], and the forth sequence segment 218 can be represented as a21=[IN]. In this embodiment, it can be seen that the two sequence segments selected in step S210 each have a length of one unit, and the distance between them is N−1 units. The distance between two sequence segments can be defined as between the heads, ends or median points of the two sequence segments, or as between two other symbols spaced equally from a corresponding reference point.

In calculating the intermediate CFOs, the sequence segments 212 and 214 are first correlated with the sequence segments 216 and 218, respectively, as shown in the following Equation (1):

$$C_{11} = \sum_{k=1}^{1} \text{Seg}_{11}(k) \cdot a_{11}(k)^*, \quad C_{21} = \sum_{k=1}^{1} \text{Seg}_{21}(k) \cdot a_{21}(k)^* \quad (1)$$

Where $\text{Seg}_{ij}(k)$ represents the kth symbol in the sequence segment $\text{Seg}_{ij}$, $a_{ij}(k)$ represents the kth symbol in the corresponding sequence segment $a_{ij}$ selected from the pre-stored sync sequence, and $a_{ij}(k)^*$ represents the conjugate of $a_{ij}(k)$.

Next, one intermediate CFO is estimated according to the following Equation (2):

$$R_1(\Delta \tilde{f}) = \arg(\{C_{11}^* \cdot C_{21}\}/[2\pi T_c \cdot (N-1)]) \quad (2)$$

where $T_c$ represents the duration for one symbol, (N−1) represents the distance between the two sequence segments currently selected, the function arg( ) is employed to calculate the radial angle of one complex number which lies in the range of [−π,π], and $R_1(\Delta \tilde{f})$ is the intermediate CFO estimated in this step. The intermediate CFO obtained in step S210 can be represented as $\Delta \tilde{f} = R_1(\Delta \tilde{f}) = \arg\{C_{11}^* \cdot C_{21}\}/[2\pi T_c \cdot (N-1)]$.

Similarly, in the subsequent step S220 the first and second sequence segments 222 and 224 are selected from the received sync sequence and denoted respectively as $\text{Seg}_{12} = [r_1, r_2]$ and $\text{Seg}_{22} = [r_{N-1}, r_N]$; and the third and forth sequence segments 226 and 228 are selected from the pre-stored sync sequence and denoted respectively as $a_{12} = [l_1, l_2]$ and $a_{22} =$ $[l_{N-1}, l_N]$. It can be seen that each of the sequence segments has a length of two units, and the distance between the first and second sequence segments is (N−2). One new intermediate CFO, $R_2(\Delta \tilde{f})$, can be obtained after correlation and estimation as shown in the following Equations (3) and (4):

$$C_{12} = \sum_{k=1}^{2} \text{Seg}_{12}(k) \cdot a_{12}(k)^*, \quad C_{22} = \sum_{k=1}^{2} \text{Seg}_{22}(k) \cdot a_{22}(k)^* \quad (3)$$

$$R_2(\Delta \tilde{f}) = \arg\{C_{12}^* \cdot C_{22}\} / [2\pi T_c \cdot (N-2)] \quad (4)$$

As can be seen in steps S210 and S220, the embodiment of the invention supports that the two selected sequence segments don't adjoin, and thus the distance between them can be chosen to be longer.

It should be noted that the selection of length and distance for each sequence segment in steps S210 and S220 is intended to be only an example. Preferably, sequence segments of different lengths and mutual distances are selected in different steps, since selecting repeatedly sequence segments of the same length and mutual distances in different steps is unlikely to significantly improve accuracy for the corresponding intermediate CFO.

Similar segmentation, correlation and estimation are repeated in subsequent steps to obtain a plurality of intermediate CFOs.

In particular, the first and second sequence segments 232 and 234 are selected in step S230, and the length and mutual distance for them are both (N/2) units, i.e., half of the sync sequence. The corresponding intermediate CFO, $R_{(N/2)}(\Delta \tilde{f})$, can be calculated by the following Equation (5):

$$R_{N/2}(\Delta \tilde{f}) = \arg\{C_{1(N/2)}^* \cdot C_{2(N/2)}\}/[\pi T_c N] \quad (5)$$

Obviously, the length and mutual distance for the sequence segments in S230 are equal to the maximums of those in a conventional method, and the resultant intermediate CFO has an accuracy equivalent to that by the conventional method.

In the final step S240, the two selected sequence segments 242 and 244 have a length of (N−1) units and a mutual distance of one unit. The corresponding intermediate CFO, $R_{(N-1)}(\Delta \tilde{f})$, can be calculated by the following Equation (6):

$$R_{(N-1)}(\Delta \tilde{f}) = \arg\{C_{1(N-1)}^* \cdot C_{2(N-1)}\}/[2\pi T_c] \quad (6)$$

As can be seen in steps S240, the embodiment of the present invention supports that the two selected sequence segments partially overlap.

It should be appreciated for those skilled in the art that, in addition to evaluating one intermediate CFO with four selected sequence segments in according with the Equations (1) to (6), the embodiment of the present invention can also utilize other algorithms, such as calculation methods for intermediate CFO disclosed in U.S. Pat. No. 4,527,278 and US 2003/0185180, to obtain one evaluated CFO with four selected sequence segments.

In each of the steps where the selected sequence segments each have a length greater than half of that of the received sync sequence, the resultant phase can be obtained with an accuracy higher than that for the step S230, and thus the longer the sequence segment is, the higher the accuracy is likely to be for the obtained phase. Moreover, in each of the steps where the distances between the selected sequence segments each are larger than half length of the received sync sequence, the resultant phase difference can be obtained with an accuracy higher than that for the step S230, and thus the longer the distance is, the higher the accuracy is for the obtained phase difference. Consequently, it is obvious that sequence segments of varying lengths and mutual distances contribute differently to the accuracies for corresponding CFOs, thereby resulting in a plurality of intermediate CFOs with different accuracies.

As well known, a signal may encounter interference during transmission and suffer from distortion. Therefore, a signal containing sync sequence may be distorted after transmission with different channel qualities, and intermediate CFOs with different accuracies may be generated through correlation between a sequence segment extracted from the sync sequence and a corresponding part in an undisturbed pre-stored sync sequence. So it can be concluded that the difference in channel quality will have an influence on the CFO calculation. Generally, when the channel quality for a channel transmitting the received sync sequence is very good, for example, the received signal has high SNR (signal-to-noise ratio), signal strength, etc., the accuracy for an intermediate CFO calculated from a short sequence segment doesn't hold a considerable inferiority to that from a long sequence segment. While if the channel quality is very bad, the intermediate CFO calculated from a short sequence segment will have a degraded accuracy. In view of the above problem, the embodiment of the present invention aims to allocate different weights to different intermediate CFOs based on the status of channel quality.

In the weighting process, different weights can be allocated to different intermediate CFOs calculated from sequence segments of varying lengths. As expressed in the Equation (7), intermediate CFOs with larger weights make greater contribution to the final calculation result:

$$\sum_{m=1}^{N-1} w(m) \cdot R_m(\Delta \tilde{f}) = \quad (7)$$

$$w(1)R_1(\Delta \tilde{f}) + w(2)R_2(\Delta \tilde{f}) + \ldots + w(N-1)R_{N-1}(\Delta \tilde{f})$$

where $\{w(m), m=\{1, \ldots, N-1\}$ represents the weights allocated to $\{R_m(\Delta \tilde{f}), m=\{1, \ldots, N-1\}$ If a variable $\Delta f$ is utilized to replace the estimated $R_m(\Delta \tilde{f})$ on the left side of the Equation (7), the mean of CFO can be calculated as $\Delta f = \Delta \tilde{f}$.

A method for allocating weights to a plurality of intermediate CFOs based on the difference in channel quality is proposed in the embodiment of the present invention, and the detailed description thereof is given as follows.

When channel quality is good, for example, when some criterion for evaluating channel quality, such as SNR, received power and the like, is greater than a predefined value, the intermediate CFOs calculated from shorter sequence segments are given weights equal to or greater than those for the intermediate CFOs calculated from longer sequence segments. This is because, when the channel quality is good, the received sync sequence is subjected to less inference and hence narrower possibility of distortion, the accuracy, for example, obtained after correlation of shorter sequence segments is comparable to that for longer sequence segments and hence makes comparable contribution to the accuracy of the final CFO.

When channel quality is bad, for example, when some criterion for evaluating channel quality, such as SNR, received power and the like, isn't greater than a predefined value, the intermediate CFOs calculated from shorter sequence segments are given weights equal to or less than those for the intermediate CFOs calculated from longer sequence segments. This is because in this case the received sync sequence is subjected to more inference and hence a greater possibility of distortion, and the accuracy obtained after correlation of shorter sequence segments is far worse than that for longer sequence segments.

Additionally, the weights allocated to the intermediate CFOs calculated from shorter sequence segments in the case of a good channel quality are not less than those allocated to the intermediate CFOs that are calculated from sequence segments of the same length and distance in the case of a bad channel quality.

Furthermore, the weights allocated to the intermediate CFOs calculated from longer sequence segments in the case of a bad channel quality are not less than those allocated to the intermediate CFOs calculated from sequence segments of the same length and distance in the case of a good channel quality.

As an example of weight allocation, if all the w(m) are given the same weight, the arithmetical mean of the final CFO can be determined, that is, all the intermediate CFOs make the same contribution to the final CFO. Since there is no weighting process in the conventional method, it is impossible to distinguish weights for different intermediate CFOs each of which thus makes the same contribution to the final CFO.

As another example of weight allocation, the approach for allocating weights in another embodiment is to allocate weights based on the following Equation (8) in a bad channel quality status:

$$w(m)=m, m=\{1,2,\ldots,N-1\} \quad (8)$$

that is, the intermediate CFOs calculated from longer sequence segments have higher accuracies and hence are given larger weights. The mean of the final CFO $\Delta f$ can be gained by the following Equation (9):

$$\sum_{i=1}^{N-1} w(i) R_i(\Delta \tilde{f}) = w(1)R_1(\Delta \tilde{f}) + w(2)R_2(\Delta \tilde{f}) + \ldots + w(N-1)R_{N-1}(\Delta \tilde{f}) \quad (9)$$

$$= R_1(\Delta \tilde{f}) + 2R_2(\Delta \tilde{f}) + \ldots + (N-1)R_{N-1}(\Delta \tilde{f})$$

$$\cong \Delta \tilde{f} + 2\Delta \tilde{f} + \ldots + (N-1)\Delta \tilde{f}$$

$$\Rightarrow \Delta f \cong \Delta \tilde{f} \cong \frac{2}{(N-1)N} \sum_{i=1}^{N-1} i R_i(\Delta \tilde{f})$$

When the channel quality is good, weights are allocated as expressed in the following Equation (10):

$$w(m)=N-m, m=\{1,2,\ldots,N-1\} \quad (10)$$

In the same way, the mean of the final CFO $\Delta f$ can be gained by the following Equation (11):

$$\sum_{i=1}^{N-1} w(i) R_i(\Delta \tilde{f}) = w(1)R_1(\Delta \tilde{f}) + w(2)R_2(\Delta \tilde{f}) + \ldots + w(N-1)R_{N-1}(\Delta \tilde{f}) \quad (11)$$

$$= (N-1)R_1(\Delta \tilde{f}) + (N-2)R_2(\Delta \tilde{f}) + \ldots + R_{N-1}(\Delta \tilde{f})$$

$$\cong \Delta \tilde{f} + 2\Delta \tilde{f} + \ldots + (N-1)\Delta \tilde{f}$$

$$\Rightarrow \Delta f \cong \Delta \tilde{f} \cong \frac{2}{(N-1)N} \sum_{i=1}^{N-1} (N-i) R_i(\Delta \tilde{f})$$

Furthermore, by utilizing the difference in channel quality as well as in precision for a plurality of intermediate CFOs, another embodiment of the invention provides an approach for optimizing the above weight allocation in order to reduce the required computing load.

When the channel quality is good, for example, when the C/I (carrier-to-inference) ratio is larger than a predefined value, if the values of intermediate CFOs calculated from several continuous long sequence segments have no or negligible difference, there is no need to process the other sequence segments of longer lengths so that the computing load can be reduced. For instance, if the value of an intermediate CFO calculated from a several sequence segment of length n has no or negligible difference compared with the values of several intermediate CFOs previously calculated from several sequence segments of lengths slightly less than n, it is unnecessary to carry out corresponding operation on other sequence segments of lengths more than n. Therefore, the corresponding calculation in the Equation (7) can be simplified as the following Equation (12):

$$\sum_{m=1}^{N-1} w(m) \cdot R_m(\Delta \tilde{f}) \approx \sum_{m=1}^{n} w(m) \cdot R_m(\Delta \tilde{f}) = \quad (12)$$

$$w(1)R_1(\Delta \tilde{f}) + \ldots + w(n)R_n(\Delta \tilde{f})$$

where $n \leq N$.

Similarly, when the channel suffers from serious inference, the intermediate CFOs calculated from short sequence segments, such as those with a length of only one or several symbols, will have very low accuracies, which may introduce greater error to the weighting process for the final CFO calculation. Therefore, the processing on short sequence segments can be omitted, and instead the calculation can begin immediately with sequence segments of a certain length, as expressed in the Equation (13):

$$\sum_{m=1}^{N-1} w(m) \cdot R_m(\Delta \tilde{f}) \approx \sum_{m=k}^{N-1} w(m) \cdot R_m(\Delta \tilde{f}) = \quad (13)$$

$$w(k)R_k(\Delta \tilde{f}) + \ldots + w(N-1)R_{N-1}(\Delta \tilde{f})$$

where k represents the minimum length for the selected sequence segments and can be assigned as a large value.

The present invention further proposes a corresponding apparatus for implementing the methods in the respective embodiments above described.

Figure 3:
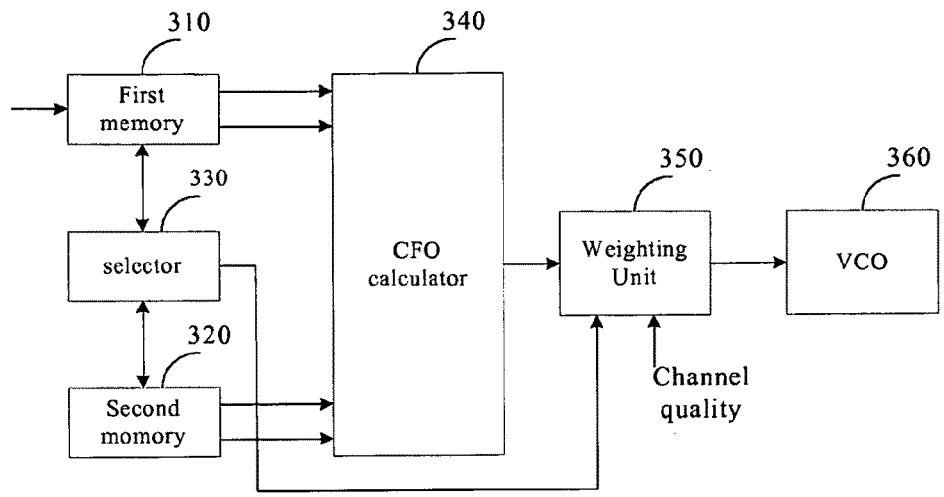
FIG. 3 shows a block diagram for a receiver implemented according to the embodiment.

FIG. 3 is a block diagram for a receiver implemented according to one embodiment of the present invention. In FIG. 3, the receiver 300 includes a first memory 310, a second memory 320, a selector 330, a CFO calculator 340 and a weighting unit 350.

The first and second memories 310 and 320 are configured to store a received sync sequence and a pre-stored sync sequence, respectively. The selector 330 is provided to perform multi-step selection, in every step of which two sequence segments of same length and certain distance are selected from each of the first and second memories 310 and 320. The CFO calculator 340 is employed to calculate a plurality of intermediate CFOs correspondingly, with one intermediate CFO with certain accuracy being obtained in every calculation step by using the selected four sequence segments. As shown in FIG. 3, the CFO calculator 340 receives the four selected sequence segments directly from the first and second memory 310 and 320. To those skilled in the art, however, it should be understood that the selector 330 can extract the four sequence segments from the first and second memories 310 and 320 and input them to the CFO calculator 340 without any direct connection established between the CFO calculator 340 and the two memories 310 and 320.

Channel quality can be acquired through conventional parameters, such as SNR, C/I, RSSI (received signal strength index) and other parameters indicating the channel quality. Further, the channel quality can be an evaluated one that is obtained after the evaluation on received signal by some evaluating units.

The weighting unit 350 gives weights to the plurality of intermediate CFOs calculated by the CFO calculator 340 based on the channel quality and indication from the selector 330 in order to generate a final CFO. The indication, which is notified to the weighting unit 350 by the selector 330, includes at least the length of a sequence segment corresponding to the intermediate CFO being currently weighted.

The receiver 300 can further include a local oscillator 360 such as VCO. Then, the final CFO may be utilized to adjust the local oscillator 360 or a local carrier frequency generation circuit containing a local oscillator, so as to achieve synchronization between the local carrier frequency and the modulation carrier frequency for transmission signal.

Figure 4:
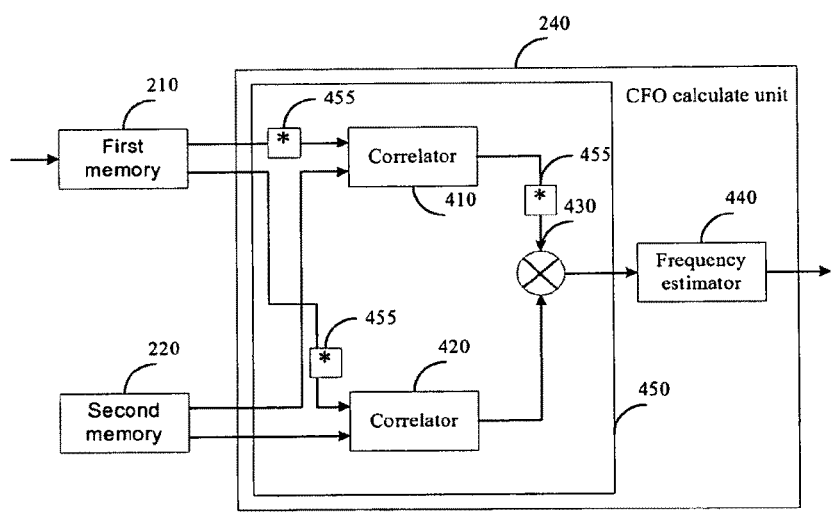
FIG. 4 shows a schematic diagram for a CFO calculator implemented according to the embodiment.

FIG. 4 shows a CFO calculator according to the embodiment, wherein correlation and evaluation operations can be performed in accordance to the Equations (1) to (6). The CFO calculator includes two correlators 410 and 420, one multiplier 430 and a frequency estimator 440. In FIG. 4, the CFO calculator 340' can further include a plurality of conjugate operation units 455, and the operator * denotes conjugate operation. The correlators 410 and 420 perform the correlation operations as expressed in the Equations (1) and (3), and the multiplier 430 and the frequency estimator 440 execute the operations as expressed in the Equations (2), (5) and (6). In particular, the correlators 410 and 420 and the multiplier 430 can construct a calculator 450 that has the basic function of calculating phase and phase difference. Therefore, other methods for calculating phase and phase difference with four sequence segments are also applicable to the embodiments of the present invention.

To those skilled in the art, it should be appreciated that various modifications can be made to the method and apparatus for estimating carrier frequency offset disclosed in the present invention, and thus the scope of the invention should be defined by the content of the appended claims.

Such modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A method for estimating carrier frequency offset (CFO), comprising steps of:
   a) calculating a plurality of corresponding intermediate CFOs, respectively, based on one received sync sequence and one pre-stored sync sequence through multi-step calculation performed on the same received sync sequence and on the same pre-stored sync sequence, wherein, in each step of the multi-step calculation one corresponding intermediate CFO is calculated based on a sequence segment of said received sync sequence and on a sequence segment of said pre-stored sync sequence; and wherein the sequence segments in each step of the multi-step calculation have a different length relative to other steps in the multi-step calculation; and
   b) weighting said plurality of intermediate CFOs to generate one final CFO, wherein different weights are allocated to different CFOs calculated from sequence segments of varying lengths and the different weights are based on a channel quality of a channel transmitting said received sync sequence.

2. The method according to claim 1, wherein each calculation step in said step a) further comprises steps of:
   selecting a first sequence segment and a second sequence segment of the same length as said first sequence segment from said received sync sequence;
   selecting a third sequence segment and a fourth sequence segment from said pre-stored sync sequence; and
   calculating said intermediate CFO through a predefined operation based on said four sequence segments.

3. The method according to claim 2, wherein said intermediate CFOs calculated in different calculation steps are independent from one another.

4. The method according to claim 1, wherein the length of each of said sequence segments is not larger than a difference value that equals a length of said received sync sequence minus 1.

5. The method according to claim 2, wherein a distance between said first and second sequence segments varies in different calculation steps to obtain a plurality of phase differences with different precisions.

6. The method according to claim 5, wherein the distance between said first and second sequence segments is not larger than a difference value that equals a length of said received sync sequence minus 1.

7. The method according to claim 1, wherein said step b) comprises allocating, to an intermediate CFO calculated from four shorter sequence segments, a weight, which is not less than a weight allocated to an intermediate CFO calculated from four longer sequence segments, when said channel quality is greater than a predefined value.

8. The method according to claim 1, wherein said step b) comprises allocating, to an intermediate CFO calculated from four shorter sequence segments, a weight, which is not larger than a weight allocated to an intermediate CFO calculated from four longer sequence segments, when said channel quality is not greater than a predefined value.

9. The method according to claim 1, wherein said step b) comprises allocating, when said channel quality is greater than a predefined value, to an intermediate CFO calculated from four shorter sequence segments, a weight which is not less than a weight allocated when said channel quality is not greater than a predefined value.

10. The method according to claim 1, wherein said step b) comprises allocating, when said channel quality is greater than a predefined value, to an intermediate CFO calculated from four longer sequence segments, a weight which is not larger than a weight allocated when said channel quality is not greater than a predefined value.

11. A receiver, comprising:
a first memory for storing one received sync sequence received from a channel;
a second memory for storing one pre-stored sync sequence;
a selector for selecting a plurality of sequence segments from said received sync sequence and said pre-stored sync sequence through multi-step calculation, wherein, in each step, said selector selects a first sequence segment and a second sequence segment from said received sync sequence as well as a third sequence segment and a fourth sequence segment from said pre-stored sync sequence, wherein the sequence segments have a different length in each step;
a carrier frequency offset (CFO) calculator for generating a plurality of intermediate CFOs through a multi-step calculation based on the plurality of sequence segments of the same received sync sequence and the same pre-stored sequence, wherein, in each step of the multi-step calculation, said CFO calculator receives said four sequence segments and calculates one intermediate CFO; and
a weighting unit for weighting said plurality of intermediate CFOs to generate one final CFO, wherein different weights are allocated to different intermediate CFOs calculated from sequence segments of varying lengths and the different weights are based on an indication of a channel quality of said channel.

12. The receiver according to claim 11, wherein said CFO calculator further comprises:
a calculator for calculating said one intermediate CFO based on said received four sequence segments.

13. The receiver according to claim 11, wherein a distance between said first and second sequence segments varies in different calculation steps.

14. A mobile device, comprising:
a front-end processing unit for converting one received wireless signal received on a channel into one received sync sequence;
a carrier frequency offset estimator including:
a first memory for storing said received sync sequence;
a second memory for storing one pre-stored sync sequence;
a selector for selecting a plurality of sequence segments from said received sync sequence and said pre-stored sync sequence through a multi-step calculation, wherein, in each step of the multi-step calculation said selector selects a first sequence segment and a second sequence segment from said received sync sequence as well as a third sequence segment and a fourth sequence segment from said pre-stored sync sequence, wherein in each step of the multi-step calculation, the sequence segments have a different lengths relative to other steps in the multi-step calculation;
a carrier frequency offset calculator for generating a plurality of intermediate CFOs through the multi-step calculation based on the plurality of sequence segments of the same received sync sequence and the same pre-stored sequence, wherein, in each step, said CFO calculator receives said four sequence segments and calculates one intermediate CFO;
a weighting unit for weighting said plurality of intermediate CFOs to generate one final CFO, wherein different weights are allocated to different intermediate CFOs calculated from sequence segments of varying lengths and the different weights are based on an indication of a channel quality of said channel; and
a local carrier generator, wherein said final CFO is utilized to adjust a frequency for a local carrier generated by said local carrier generator.

15. The method according to claim 1, wherein the steps in the multi-step calculation are performed sequentially.

16. The method according to claim 2, wherein in each step of the multi-step calculation, the respective first, second, third, and fourth sequence segments have the same length.

17. The receiver of claim 11, wherein the weighting unit is configured and arranged to allocate to an intermediate CFO calculated from four shorter sequence segments a weight, which is not less than a weight allocated to an intermediate CFO calculated from four longer sequence segments, when said channel quality is greater than a predefined value.

* * * * *